(12) United States Patent
Taniguchi

(10) Patent No.: US 9,976,044 B2
(45) Date of Patent: May 22, 2018

(54) POLYVINYL CHLORIDE RESIN COMPOSITION FOR AUTOMOTIVE ELECTRIC WIRE, AND ULTRATHIN-WALL LOW-VOLTAGE ELECTRIC WIRE FOR AUTOMOBILE

(71) Applicant: Yazaki Corporation, Minato-ku, Tokyo (JP)

(72) Inventor: Tomohiro Taniguchi, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 252 days.

(21) Appl. No.: 14/710,702

(22) Filed: May 13, 2015

(65) Prior Publication Data

US 2015/0240104 A1 Aug. 27, 2015

Related U.S. Application Data

(63) Continuation of application No. PCT/JP2013/080693, filed on Nov. 13, 2013.

(30) Foreign Application Priority Data

Nov. 13, 2012 (JP) .................. 2012-248999

(51) Int. Cl.
*C09D 127/06* (2006.01)
*H01B 3/44* (2006.01)
*H01B 7/02* (2006.01)

(52) U.S. Cl.
CPC ........... *C09D 127/06* (2013.01); *H01B 3/443* (2013.01); *H01B 7/0275* (2013.01); *Y10T 428/2933* (2015.01)

(58) Field of Classification Search
CPC ...... C09D 127/06; C09D 127/08; H01B 3/44; H01B 3/443
USPC .......... 524/295, 296, 314; 106/505; 174/110 SR; 525/331.5
See application file for complete search history.

(56) References Cited

U.S. PATENT DOCUMENTS

| | | | |
|---|---|---|---|
| 8,754,157 B2 | 6/2014 | Furukawa et al. | |
| 2012/0172511 A1* | 7/2012 | Furukawa .............. | H01B 3/443 524/296 |
| 2012/0252869 A1 | 10/2012 | Collard et al. | |
| 2013/0062094 A1* | 3/2013 | Naert ................. | C08K 5/10 174/110 SR |
| 2014/0060925 A1 | 3/2014 | Furukawa et al. | |

FOREIGN PATENT DOCUMENTS

| | | |
|---|---|---|
| CN | 101735533 A | 6/2010 |
| CN | 102575077 A | 7/2012 |
| JP | H07-102141 A | 4/1995 |
| JP | H07-211153 A | 8/1995 |
| JP | H08-007652 A | 1/1996 |
| JP | H10-241462 A | 9/1998 |
| JP | 2004-193138 A | 7/2004 |
| JP | 2010-055925 A | 3/2010 |
| JP | 2010-168409 A | 8/2010 |
| JP | 2011-126980 A | 6/2011 |
| JP | 2013-129776 A | 7/2013 |
| JP | 2013-147519 A | 8/2013 |
| WO | 2011/113707 A1 | 9/2011 |
| WO | 2011152295 A1 | 12/2011 |
| WO | 2012165480 A1 | 12/2012 |

OTHER PUBLICATIONS

May 31, 2016—(EP) Extended Search Report—App 13855967.9.
May 31, 2016—(JP) Notification of Reasons for Refusal—App 2014-547005, Eng Tran.
Jun. 2, 2016—(CN) Notification of the Second Office Action—App 201380059314.2, Eng Tran.
Dec. 17, 2013—International Search Report—Intl App PCTJP2013080693.
Dec. 16, 2015—(CN) Notification of the First Office Action—App 201380059314.2, Eng Tran.

* cited by examiner

*Primary Examiner* — Matthew D Matzek

(74) *Attorney, Agent, or Firm* — Banner & Witcoff, Ltd.

(57) ABSTRACT

The polyvinyl chloride resin composition for automotive electric wire of the present invention comprises (A) 100 parts by weight of polyvinyl chloride and, incorporated thereinto, (B) 24.0-26.0 parts by weight of a trimellitic-acid-based ester plasticizer, (C) 5-10 parts by weight of a non-lead stabilizer, (D) 2-10 parts by weight of a reinforcing agent, (E) 2-8 parts by weight of an impact absorber, and (F) 0.3-1.2 parts by weight of a processing aid, and has a Shore D hardness of 68 or higher and a cold resistance, as a property of the material, of −10° C. or below.

4 Claims, No Drawings

POLYVINYL CHLORIDE RESIN COMPOSITION FOR AUTOMOTIVE ELECTRIC WIRE, AND ULTRATHIN-WALL LOW-VOLTAGE ELECTRIC WIRE FOR AUTOMOBILE

CROSS REFERENCE TO RELATED APPLICATION

This application is a continuation of PCT application No. PCT/JP2013/080693, which was filed on Nov. 13, 2013 based on Japanese Patent Application (No. 2012-248999) filed on Nov. 13, 2012, the contents of which are incorporated herein by reference. Also, all the reference cited herein are incorporated as a whole.

BACKGROUND OF THE INVENTION

1. Technical Field

The present invention relates to a polyvinyl chloride resin composition for use as an insulator of insulated electric wires for use in automotive wire harnesses, electronic appliances, etc. In particular, the invention relates to a ultrathin-wall low-voltage electric wire for automobile, which is obtained by thinly coating a conductor with the polyvinyl chloride resin composition as an insulator for automotive low-voltage electric wire.

2. Background Art

As a result of trends toward electronization in vehicle-mounted devices, etc., the number of electric/electronic wiring circuits within the motor vehicle has increased remarkably and the spaces within the motor vehicle which are occupied thereby have increased, resulting in an increase in the overall weight of the motor vehicle due to the automotive electric wires. Such increases in the weight of insulated electric wires have resulted in a decrease in the fuel economy of motor vehicles. Being lightweight is desirable from the standpoint of an improvement in fuel economy, and the increase in the use amount of insulated electric wires is contrary to a reduction in the weight of insulated electric wires. However, from the standpoint of mounting microcomputers in a motor vehicle and driving the vehicle safely and comfortably, it is impossible to avoid increases in the amount of automotive electric wires used. Under these circumstances, investigations on a weight reduction in automotive electric wires are being made recently.

The weight of automotive electric wires to be used can be reduced by reducing the diameters of automotive electric wires or by reducing the thickness of the insulators of electric wires.

In general, polyvinyl chloride resin compositions consisting mainly of polyvinyl chloride are being used as the insulators of insulated electric wires for use in wire harnesses for motor vehicles and in electronic appliances, etc.

A plasticizer has been incorporated into these polyvinyl chloride resin compositions. Increasing the incorporation amount of the plasticizer enhances the flexibility of the polyvinyl chloride resin composition and can improve the cold resistance thereof. However, the increased plasticizer amount results in decreases in mechanical property, e.g., abrasion resistance.

In recent years, with the trend toward weight reduction in motor vehicles and size reduction and precision enhancement in electronic appliances, the wire harnesses and insulated electric wires to be used therein have come to be required to be reduced in weight. For attaining the weight reduction, the electric wires are required to be reduced in diameter and the insulator with which a conductor wire is coated is required to have a reduced thickness. Reductions in the diameter of electric wires and in coating thickness are prone to result in a further decrease in abrasion resistance. Although it is possible to improve the abrasion resistance by reducing the amount of the plasticizer to be incorporated and thereby increasing the hardness of the material, the mere reduction in plasticizer amount results in a decrease in the cold resistance of the polyvinyl chloride resin composition, making the electric wire unable to retain low-temperature characteristics.

Because of this, the insulators of these insulated electric wires generally are constituted of a resin composition consisting mainly of polyvinyl chloride, and currently have a thickness down to about 0.35 mm since this resin composition in a thin film form has poor mechanical strength, in particular, poor abrasion resistance.

A technique in which such a resin composition including polyvinyl chloride as the main component is applied in a thickness of 0.08-0.2 mm is described, for example, in JP-A-10-241462.

JP-A-10-241462 discloses a thin-wall insulated electric wire wherein an insulator including polyvinyl chloride as the main component and having a Shore D hardness of 72 or higher has been formed by extrusion molding in a thickness of 0.08-0.2 mm, and wherein the Shore D hardness of 72 or higher is obtained by regulating the amount of an octyl ester of trimellitic acid to be incorporated.

A technique in which a resin composition including polyvinyl chloride as the main component is applied in a thickness of 0.16-0.10 mm is described, for example, in JP-A-8-7652.

JP-A-8-7652 discloses an automotive thin-wall low-voltage electric wire obtained by extrusion coating with a vinyl chloride resin composition in a thickness of 0.16-0.10 mm, the vinyl chloride resin composition being configured by incorporating 5-25 parts by weight of a plasticizer, 4-8 parts by weight of a stabilizer, 0-10 parts by weight of a filler, and 1-5 parts by weight of an acrylic processing aid into 100 parts by weight of the sum of a graft PVC copolymer with which an acrylic rubber has been graft-polymerized and PVC, the amounts of the graft PVC copolymer and the PVC being in the ranges of 100-20 parts by weight and 0-80 parts by weight, respectively.

Namely, either a graft PVC copolymer alone with which an acrylic rubber has been graft-polymerized or a combination of the graft PVC copolymer and PVC is compounded in a amount of 100 parts by weight with a plasticizer, a stabilizer, a fuller, and an acrylic processing aid to configure the resin composition.

SUMMARY OF THE INVENTION

The composition disclosed in JP-A-10-241462 has excellent performance with respect to abrasion resistance, but has the possibility of impairing other properties (e.g., low-temperature characteristics) required of electric wires.

The composition actually produced by incorporating up to 23.5 parts by weight of n-TOTM (octyl ester of trimellitic acid) into 100 parts by weight of polyvinyl chloride has a problem in that the cold resistance of the material has a value within a plus-temperature range and the electric wire cannot withstand low temperatures.

Although the recipe according to JP-A-10-241462 is excellent in terms of abrasion resistance, this composition has a high Shore D hardness and it is extremely difficult to stably extrusion-mold the composition in an even insulator thickness.

Furthermore, in JP-A-10-241462, in the case of the recipe which attains a Shore D hardness of 78 or higher, it is difficult to clear the low-temperature resistance as provided for in ISO 6722. Even when capable of clearing the low-temperature resistance, none of the individual recipes shown therein can clear the low-temperature impact resistance according to current ISO 6722 in the case where the insulator thickness is 0.20 mm or less.

JP-A-8-7652 is intended to provide an automotive thin-wall electric wire using a recipe including a graft PVC copolymer. This technique is not for providing an electric wire having a coating thickness as small as 0.15-0.25 mm using a resin composition in which a general PVC resin accounts for 100 parts by weight.

The present invention provides materials for small-diameter electric wires or for thin-wall electric wires. A first object of the invention is to provide a polyvinyl chloride resin composition for automotive electric wire which is capable of satisfying the various properties according to ISO 6722 (particularly, an abrasion resistance and low-temperature resistance), even when extrusion coating an insulator having a Shore D hardness of 68 or higher and a cold resistance as the material of −10° C. or below on a conductor in a thickness of 0.15-0.25 mm.

A second object of the invention is to provide an ultrathin-wall low-voltage electric wire for automobile which is capable of satisfying the various properties according to ISO 6722 (particularly, an abrasion resistance and low-temperature resistance), by extrusion coating an insulator having a Shore D hardness of 68 or higher and a cold resistance as the material of −10° C. or below on a conductor in a thickness of 0.15-0.25 mm.

A third object of the invention is to provide a polyvinyl chloride resin composition for automotive electric wire which is capable of satisfying the various properties according to ISO 6722 (particularly, an abrasion resistance and low-temperature resistance), even when extrusion coating an insulator having a Shore D hardness of 63 to 67 and a cold resistance as the material of −20° C. to −12° C. on a conductor in a thickness of 0.15-0.25 mm.

A fourth object of the invention is to provide an ultrathin-wall low-voltage electric wire for automobile which is capable of satisfying the various properties according to ISO 6722 (particularly, an abrasion resistance and low-temperature resistance), by extrusion coating an insulator having a Shore D hardness of 63 to 67 and a cold resistance as the material of −20° C. to −12° C. on a conductor in a thickness of 0.15-0.25 mm.

Means for Solving the Problems

The invention has been achieved in order to overcome the problems described above.

The polyvinyl chloride resin composition for automotive electric wire according to the first aspect of the invention has been configured so as to comprises (A) 100 parts by weight of polyvinyl chloride and, incorporated thereinto, (B) 24.0-26.0 parts by weight of a trimellitic-acid-based ester plasticizer, (C) 5-10 parts by weight of a non-lead stabilizer, (D) 2-10 parts by weight of a reinforcing agent, (E) 2-8 parts by weight of an impact absorber, and (F) 0.3-1.2 parts by weight of a processing aid, and has a Shore D hardness of 68 or higher and a cold resistance, as a property of the material, of −10° C. or below.

The ultrathin-wall low-voltage electric wire for automobile according to the second aspect of the invention has been configured by extrusion coating in a thickness of 0.15-0.25 mm using a polyvinyl chloride resin composition for automotive electric wires which comprises (A) 100 parts by weight of polyvinyl chloride and, incorporated thereinto, (B) 24.0-26.0 parts by weight of a trimellitic-acid-based ester plasticizer, (C) 5-10 parts by weight of a non-lead stabilizer, (D) 2-10 parts by weight of a reinforcing agent, (E) 2-8 parts by weight of an impact absorber, and (F) 0.3-1.2 parts by weight of a processing aid, and has a Shore D hardness of 68 or higher and a cold resistance, as a property of the material, of −10° C. or below.

The polyvinyl chloride resin composition for automotive electric wires according to the third aspect of the invention has been configured so as to comprises (A) 100 parts by weight of polyvinyl chloride and, incorporated thereinto, (B) 26.0-28.0 parts by weight of a trimellitic-acid-based ester plasticizer, (C) 5-10 parts by weight of a non-lead stabilizer, (D) 2-10 parts by weight of a reinforcing agent, (E) 2-8 parts by weight of an impact absorber, and (F) 0.3-1.2 parts by weight of a processing aid, and has a Shore D hardness of 63-67 and a cold resistance of −20° C. to −12° C.

The ultrathin-wall low-voltage electric wire for automobile according to the fourth aspect of the invention has been configured by extrusion coating in a thickness of 0.15-0.25 mm using a polyvinyl chloride resin composition for automotive electric wires which comprises (A) 100 parts by weight of polyvinyl chloride and, incorporated thereinto, (B) 26.0-28.0 parts by weight of a trimellitic-acid-based ester plasticizer, (C) 5-10 parts by weight of a non-lead stabilizer, (D) 2-10 parts by weight of a reinforcing agent, (E) 2-8 parts by weight of an impact absorber, and (F) 0.3-1.2 parts by weight of a processing aid, and has a Shore D hardness of 63-67 and a cold resistance of −20° C. to −12° C.

According to the first aspect, a polyvinyl chloride resin composition for automotive electric wires which satisfies the various properties (in particular, abrasion resistance and low-temperature resistance) as provided for in ISO 6722 can be obtained.

According to the second aspect, an ultrathin-wall low-voltage electric wire for automobile which satisfies the various properties (in particular, abrasion resistance and low-temperature resistance) as provided for in ISO 6722 can be obtained.

According to the third aspect, a polyvinyl chloride resin composition for automotive electric wires which satisfies the various properties (in particular, abrasion resistance and low-temperature resistance) as provided for in ISO 6722 can be obtained.

According to the fourth aspect, an ultrathin-wall low-voltage electric wire for automobile which satisfies the various properties (in particular, abrasion resistance and low-temperature resistance) as provided for in ISO 6722 can be obtained.

DETAILED DESCRIPTION OF THE EXEMPLARY EMBODIMENTS

Next, embodiments of the invention are explained in detail.

The polyvinyl chloride resin compositions for automotive electric wires according to the invention are configured so as to include (A) 100 parts by weight of polyvinyl chloride and, incorporated thereinto, (B) 24.0-28.0 parts by weight of a trimellitic-acid-based ester plasticizer, (C) 5-10 parts by weight of a non-lead stabilizer, (D) 2-10 parts by weight of a reinforcing agent, (E) 2-8 parts by weight of an impact absorber, and (F) 0.3-1.2 parts by weight of a processing aid.

Here, use of polyvinyl chloride (PVC) having an average degree of polymerization of 1,300-1,700 is suitable. Examples of polyvinyl chloride (PVC) having an average degree of polymerization of 1,300 include TK-1300 (trade name), manufactured by Shin-Etsu Chemical Co., Ltd., and TH-1300 (trade name), manufactured by Taiyo Vinyl Corp. Examples of polyvinyl chloride (PVC) having an average degree of polymerization of 1,700 include TK-1700 (trade name), manufactured by Shin-Etsu Chemical Co., Ltd., and TH-1700 (trade name), manufactured by Taiyo Vinyl Corp.

Polyvinyl chloride (PVC) has low processability when this resin is processed as such, and incorporation of a plasticizer thereinto generally renders thermal processing of the resin easy. It is desirable that a plasticizer based on an ester of trimellitic acid should be used as the plasticizer. In particular, it is desirable to use tri-n-octyl trimellitate (n-TOTM).

The larger the amount of this plasticizer, the more the PVC is plasticized. In the invention, however, the amount of the plasticizer is regulated to 24.0-28.0 parts by weight in order to render the compositions especially suitable for small-diameter, thin-wall electric wires. The reasons why the content of the trimellitic-acid-based ester plasticizer is 24.0-28.0 parts by weight are as follows. In case where the plasticizer amount is less than 24.0 parts by weight, the composition not only has poor processability and, in particular, necessitates an unnecessarily elevated processing temperature but also has impaired low-temperature resistance. In case where the trimellitic-acid-based ester plasticizer is incorporated in an amount exceeding 28.0 parts by weight, the composition undesirably has reduced abrasion resistance. Examples of the plasticizer based on a trimellitic acid ester include C-880 (trade mane), manufactured by ADEKA Corp.

The stabilizer is used in order to improve the thermal stability of each resin composition and inhibit the dehydrochlorination reaction which is a mechanism of deterioration characteristic of polyvinyl chloride.

There are Sn-based stabilizers, Ba-based stabilizers, Zn-based stabilizers, Ca-based stabilizers, and Pb-based stabilizers. However, a Zn—Ca-based stabilizer or a Zn—Mg-based stabilizer is employed since the stabilizer to be used here is a non-lead stabilizer and because of product specifications which require electrical insulating properties. The stabilizer employed here is incorporated in an amount of 5-10 parts by weight in view of the thermal aging resistance of the electric wire and processability.

The reinforcing agent is a filler which is incorporated in order to impart abrasion resistance and low-temperature impact resistance. In case where no reinforcing agent is added, the resin composition cannot satisfy not only abrasion resistance but also low-temperature impact resistance. In the invention, a reinforcing agent is incorporated in an amount of 2-10 parts by weight. Examples of this reinforcing agent are calcium carbonate ($CaCO_3$) and silica ($SiO_2$). In the invention, synthetic calcium carbonate and fine-powder silica are used in combination.

It is desirable in the invention that 1-3 parts by weight of synthetic calcium carbonate d1 and 1-7 parts by weight of fine-powder silica d2 should be incorporated as a reinforcing agent and be contained in an amount of 2-10 parts by weight in terms of the sum of the fillers, d1+d2.

The impact absorber is incorporated for the purpose of absorbing external impacts in order to prevent each composition from being suffering external damage due to external impacts especially in a low-temperature range. An example of this impact absorber is methyl methacrylate/butadiene/styrene (MBS).

In the invention, an impact absorber is contained in an amount of 2-8 parts by weight.

Polyvinyl chloride (PVC) undesirably has reduced extrudability in cases when a plasticizer is incorporated thereinto in a reduced amount in order to improve abrasion resistance. Consequently, in order to compensate for the decrease in processability due to the reduction in plasticizer amount, an acrylic processing aid and a polyethylene wax are incorporated.

The acrylic processing aid improves the processability of each composition which is being sheared during extrusion, and the polyethylene wax functions as a lubricant to also improve the processability. An example of the acrylic processing aid is PMMA (methyl methacrylate copolymer).

In the invention, an acrylic processing aid f1 and a polyethylene wax f2 are used in combination as a processing aid and incorporated in an amount of 0.3-1.2 parts by weight, thereby improving processability for producing small-diameter electric wires. In case where the processing aid is incorporated in an amount larger than 1.2 parts by weight in terms of the sum of these, f1+f2, there is a possibility that the resin-shearing force might be impaired, rather than improved, resulting in impaired extrudability.

The polyvinyl chloride resin compositions for automotive electric wires of the invention each can be prepared, for example, by adding various additive ingredients to polyvinyl chloride as the base resin and heating and kneading the mixture. For this operation, use can be made of a general kneading machine, such as open rolls, a pressure kneader, a Banbury (registered trademark) mixer, a single-screw kneading machine, or a twin-screw kneading machine. Before being heated and kneaded, the ingredients can be premixed by means of a mixer, blender, or the like.

After the heating and kneading, the mixture may be introduced into a granulator and pelletized, or may be directly pelletized with the kneading machine.

EXAMPLES

The following Examples include ultrathin-wall low-voltage electric wire for automobile each obtained by extrusion-coating a conductor in a thickness of 0.15-0.25 mm with a polyvinyl chloride resin composition for automotive electric wires which includes (A) 100 parts by weight of polyvinyl chloride and, incorporated thereinto, (B) 24.0-28.0 parts by weight of a trimellitic-acid-based ester plasticizer, (C) 5-10 parts by weight of a non-lead stabilizer, (D) 2-10 parts by weight of a reinforcing agent, (E) 2-8 parts by weight of an impact absorber, and (F) 0.3-1.2 parts by weight of a processing aid, and which has a Shore D hardness of 68 or higher and a cold resistance, as a property of the material, of −10° C. or below.

In Table 1 to Table 6, the resin compositions in the state of an electric wire were evaluated for "electric wire appearance (surface)" and "electric wire structure stability (eccentricity)", and the resin compositions were further evaluated for the following properties in accordance with the ISO 6722 standard: "hardness", "cold resistance", "abrasion resistance", "low-temperature resistance (winding test)", and "low-temperature impact resistance".

With respect to "electric wire appearance (surface)", the electric wire was visually examined to ascertain that there was neither extreme surface roughness nor strand mark nor pulsation of a conductor. In case where the electric wire had any of these defects, this electric wire was rated at "poor".

With respect to "electric wire structure stability (eccentricity)", the insulator portion is cut crosswise and the structure is examined, on the basis of the idea that the center of the conductor should be located at the same position as the center of the electric wire. The amount of eccentricity was determined using the following equation.

Amount of eccentricity=[(coating thickness $b$)−(coating thickness $a$)]/2

The amount of eccentricity is not included in the ISO 6722 standard. However, the case where the amount of eccentricity was less than 0.04 mm was rated as "good", and the case where the amount of eccentricity was 0.04 mm or larger was rated as "poor", from the standpoint of processing the electric wire.

The "hardness" was measured using a type D durometer on the basis of JIS K 7215. The larger the value thereof, the harder the material.

The "cold resistance" was examined on the basis of the cold resistance test as provided for in JIS K 6723.

For the "abrasion resistance", a scrape test was conducted in accordance with the abrasion resistance test (blade reciprocation method) as provided for in ISO 6722. In the scrape abrasion resistance test, the number of reciprocations to electrical connection was counted at 23° C. while applying a load of 7 N to the blade. Each electric wire was thus examined four times in total, each time after the electric wire was rotated by 90°. The electric wires in which the minimum number in the four examinations was 100 or larger were rated as acceptable (good), while those in which the minimum number therein was less than 100 were rated as unacceptable (poor).

The "low-temperature resistance (winding test)" is a property concerning whether or not the insulator develops cracks or pin-holes at a given low temperature. A test was conducted in accordance with the winding as provided for in the ISO 6722 standard. Namely, in the test for examining "low-temperature resistance (winding test)", a sample electric wire and a mandrel (winding base jig) having a diameter five times that of the electric wire were cooled to (−)40° C. for 4 hours or longer and the sample electric wire was then wound on the mandrel. The low-temperature resistance was assessed on the basis of whether the wound electric wire was free from exposure of the conductor and whether the electric wire was able to withstand dielectric breakdown when a voltage of 1,000 V was thereafter applied thereto for 1 minute. The electric wires which were able to withstand dielectric breakdown were rated as acceptable (good), and those unable to withstand dielectric breakdown were rated as unacceptable (poor).

With respect to the "low-temperature impact resistance", a test was conducted in accordance with the ISO 6722 standard after the test jig was cooled in a −15° C. atmosphere for 16 hours or longer and a sample (electric wire) was cooled for 4 hours or longer. Namely, the "low-temperature impact resistance" was examined in the following manner. A 100-g hammer (weight) was caused to fall freely onto the cooled sample (electric wire) from a height of 100 mm to give an impact thereto, and it was then ascertained that the insulator had no cracks. In the case where the sample was visually ascertained to have no problem, a voltage of 1,000 V was applied between the conductor and the insulator for 1 minute, and the low-temperature impact resistance was assessed on the basis of whether the sample was able to withstand dielectric breakdown. The electric wires which were able to withstand dielectric breakdown in this voltage resistance test (1 kv×1 min) were rated as acceptable (good), and those unable to withstand dielectric breakdown were rated as unacceptable (poor).

The "thermal aging resistance" was examined in the following manner. The conductor portion was removed from an electric wire, and the insulator portion only (tubular shape) as a sample was heated in a Geer oven (air replacement: 8 times/hr) at 140° C. for 480 hours. Thereafter, a tensile test was performed with a Strograph during the period from the time when 24 hours had passed since the takeout to the time when 48 hours had passed since the takeout. The samples which retained an elongation of 100% or higher were rated as "good", and those which had an elongation less than 100% were rated as "poor".

Examples according to the first to the fourth aspects of the invention are explained below while comparing Examples 1 to 30 with Comparative Examples 1 to 22, as shown in Tables 1 to 6.

The following Examples were rated as "good" with respect to each of "electric wire appearance (surface)" and "electric wire structure stability (eccentricity)", had a value of "cold resistance" of −10.0° C. or below, and were rated as acceptable (good) with respect to each of "abrasion resistance (100 times or more)", "low-temperature resistance (winding test)", and "low-temperature impact resistance".

Example 1 to Example 6

In Example 1 to Example 6, use was made of a resin composition configured by compounding (A) 100 parts by weight of polyvinyl chloride (specifically, one having an average degree of polymerization of 1,300) with (B) 24 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 3 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Example 1 to Example 3, an electric wire having a size of 0.35 mm$^2$ was coated with the resin composition in thicknesses of 0.15 mm, 0.20 mm, and 0.25 mm, respectively, to configure insulated electric wires. In Example 4 to Example 6, an electric wire having a size of 0.13 mm$^2$ was coated with the resin composition in thicknesses of 0.15 mm, 0.20 mm, and 0.25 mm, respectively, to configure insulated electric wires.

With respect to material properties, the "Shore D hardness" was "72" and the "cold resistance (° C.)" was "−11.8".

Example 1 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 372", and the "low-temperature resistance (winding test)", "low-temperature impact resistance", and "thermal aging resistance" were each "good".

Example 2 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 1,106", and the "low-temperature resistance (winding test)", "low-temperature impact resistance", and "thermal aging resistance" were each "good".

Example 3 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, >2,000", and the "low-temperature resistance (winding test)", "low-temperature impact resistance", and "thermal aging resistance" were each "good".

Example 4 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 123", and the "low-temperature resistance (winding test)", "low-temperature impact resistance", and "thermal aging resistance" were each "good".

Example 5 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 487", and the "low-temperature resistance (winding test)", "low-temperature impact resistance", and "thermal aging resistance" were each "good".

Example 6 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 892", and the "low-temperature resistance (winding test)", "low-temperature impact resistance", and "thermal aging resistance" were each "good".

Example 7 and Example 8

In Example 7 and Example 8, use was made of a resin composition configured by compounding (A) 100 parts by weight of polyvinyl chloride (specifically, one having an average degree of polymerization of 1,300) with (B) 26 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 3 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Example 7, an electric wire having a size of 0.35 mm$^2$ was coated with the resin composition in a thickness of 0.15 mm to configure an insulated electric wire. In Example 8, an electric wire having a size of 0.13 mm$^2$ was coated with the resin composition in a thickness of 0.15 mm to configure an insulated electric wire.

With respect to material properties, the "Shore D hardness" was "68" and the "cold resistance (° C.)" was "−13.8".

Example 7 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 346", and the "low-temperature resistance (winding test)", "low-temperature impact resistance", and "thermal aging resistance" were each "good".

Example 8 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 132", and the "low-temperature resistance (winding test)", "low-temperature impact resistance", and "thermal aging resistance" were each "good".

Comparative Example 1 and Comparative Example 2

In Comparative Example 1 and Comparative Example 2, use was made of a resin composition configured by compounding (A) 100 parts by weight of polyvinyl chloride (specifically, one having an average degree of polymerization of 1,300) with (B) 23.5 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 3 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Comparative Example 1, an electric wire having a size of 0.35 mm$^2$ was coated with the resin composition in a thickness of 0.15 mm to configure an insulated electric wire. In Comparative Example 2, an electric wire having a size of 0.13 mm$^2$ was coated with the resin composition in a thickness of 0.15 mm to configure an insulated electric wire.

With respect to material properties, the "Shore D hardness" was "72" and the "cold resistance (° C.)" was "−8.4".

Comparative Example 1 gave the following results. With respect to the electric wire state, the "electric wire appearance (surface)" was "poor", and the "electric wire structure stability (eccentricity)" was "good".

With respect to the electric wire properties, the "abrasion resistance (100 times or more)" was "good, 332", the "low-temperature resistance (winding test)" was "good", the "low-temperature impact resistance" was "poor", and the "thermal aging resistance" was "good".

Comparative Example 2 gave the following results. With respect to the electric wire state, the "electric wire appearance (surface)" was "poor", and the "electric wire structure stability (eccentricity)" was "good".

With respect to the electric wire properties, the "abrasion resistance (100 times or more)" was "good, 104", and the "low-temperature resistance (winding test)", "low-temperature impact resistance", and "thermal aging resistance" were each "good".

Comparative Example 3 and Comparative Example 4

In Comparative Example 3 and Comparative Example 4, use was made of a resin composition configured by compounding (A) 100 parts by weight of polyvinyl chloride (specifically, one having an average degree of polymerization of 1,300) with (B) 27.0 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 3 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Comparative Example 3, an electric wire having a size of 0.35 mm² was coated with the resin composition in a thickness of 0.15 mm to configure an insulated electric wire. In Comparative Example 4, an electric wire having a size of 0.13 mm² was coated with the resin composition in a thickness of 0.15 mm to configure an insulated electric wire.

With respect to material properties, the "Shore D hardness" was "66" and the "cold resistance (° C.)" was "−15.2".

Comparative Example 3 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "poor, 76", and the "low-temperature resistance (winding test)", "low-temperature impact resistance", and "thermal aging resistance" were each "good".

Comparative Example 4 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "poor, 34", and the "low-temperature resistance (winding test)", "low-temperature impact resistance", and "thermal aging resistance" were each "good".

Examples 1 to 8 and Comparative Examples 1 to 4 described above are shown in Table 1.

TABLE 1

| | | | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|---|
| Recipe | A | PVC (average degree of polymerization, 1,300) | | | 100 | | | | 100 | | 100 | | 100 | |
| | B | Plasticizer (n-TOTM) | | | 24 | | | | 26 | | 23.5 | | 27 | |
| | C | Stabilizer (Ca/Zn-based) | | | 5 | | | | 5 | | 5 | | 5 | |
| | D | Synthetic calcium carbonate | | | 2 | | | | 2 | | 2 | | 2 | |
| | | Silica | | | 3 | | | | 3 | | 3 | | 3 | |
| | E | MBS (methyl methacrylate/butadiene/styrene) | | | 3 | | | | 3 | | 3 | | 3 | |
| | F | Acrylic processing aid (MMA) | | | 0.5 | | | | | | 0.5 | 0.5 | 0.5 | |
| | | PE wax | | | | | | | 0.2 | | | 0.2 | 0.2 | 0.2 |
| Material property | | Hardness (Shore D) | | | 72 | | | | 68 | | 72 | | 66 | |
| | | Cold resistance (° C.) | | | −11.8 | | | | −13.8 | | −8.4 | | −15.2 | |
| Electric wire state | | Size of electric wire (sq) | 0.35 | 0.35 | 0.35 | 0.13 | 0.13 | 0.13 | 0.35 | 0.13 | 0.35 | 0.13 | 0.35 | 0.13 |
| | | Coating thickness of electric wire (mm) | 0.15 | 0.20 | 0.25 | 0.15 | 0.20 | 0.25 | 0.15 | 0.15 | 0.15 | 0.15 | 0.15 | 0.15 |
| | | Electric wire appearance (surface) | good | good | good | good | good | good | good | good | poor | poor | good | good |
| | | Electric wire structure stability (eccentricity) | good | good | good | good | good | good | good | good | good | good | good | good |
| | | Abrasion resistance | good 372 | good 1106 | good >2000 | good 123 | good 487 | good 892 | good 346 | good 132 | good 332 | good 104 | poor 76 | poor 34 |
| Electric wire property | | Low-temperature resistance (winding test) | good | good | good | good | good | good | good | good | good | good | good | good |
| | | Low-temperature impact resistance | good | good | good | good | good | good | good | good | poor | good | good | good |
| | | Thermal aging resistance | good | good | good | good | good | good | good | good | good | good | good | good |

Example 9 and Example 10

In Example 9 and Example 10, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 3 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Example 9, an electric wire having a size of 0.35 mm² was coated with the resin composition in a thickness of 0.20 mm to configure an insulated electric wire. In Example 10, an electric wire having a size of 0.13 mm² was coated with the resin composition in a thickness of 0.20 mm to configure an insulated electric wire.

With respect to material properties, the "Shore D hardness" was "70" and the "cold resistance (° C.)" was "−12.4".

Example 9 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 1,054", and the "low-temperature resistance (winding test)", "low-temperature impact resistance", and "thermal aging resistance" were each "good".

Example 10 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 454", and the "low-temperature resistance (winding test)", "low-temperature impact resistance", and "thermal aging resistance" were each "good".

Example 11 and Example 12

In Example 11 and Example 12, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 10 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 3 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Example 11, an electric wire having a size of 0.35 mm² was coated with the resin composition in a thickness of 0.20 mm to configure an insulated electric wire. In Example 12, an electric wire having a size of 0.13 mm² was coated with the resin composition in a thickness of 0.20 mm to configure an insulated electric wire.

With respect to material properties, the "Shore D hardness" was "70" and the "cold resistance (° C.)" was "−11.8".

Example 11 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 986", and the "low-temperature resistance (winding test)", "low-temperature impact resistance", and "thermal aging resistance" were each "good".

Example 12 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 516", and the "low-temperature resistance (winding test)", "low-temperature impact resistance", and "thermal aging resistance" were each "good".

Comparative Example 5 and Comparative Example 6

In Comparative Example 5 and Comparative Example 6, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 4 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 3 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Comparative Example 5, an electric wire having a size of 0.35 mm² was coated with the resin composition in a thickness of 0.20 mm to configure an insulated electric wire. In Comparative Example 6, an electric wire having a size of 0.13 mm² was coated with the resin composition in a thickness of 0.20 mm to configure an insulated electric wire.

With respect to material properties, the "Shore D hardness" was "69" and the "cold resistance (° C.)" was "−12.7".

Comparative Example 5 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 1,004", the "low-temperature resistance (winding test)" was "good", the "low-temperature impact resistance" was "good", and the "thermal aging resistance" was "poor".

Comparative Example 6 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 502", the "low-temperature resistance (winding test)" was "good", the "low-temperature impact resistance" was "good", and the "thermal aging resistance" was "poor".

Comparative Example 7 and Comparative Example 8

In Comparative Example 7 and Comparative Example 8, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 11 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 3 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Comparative Example 7, an electric wire having a size of 0.35 mm² was coated with the resin composition in a thickness of 0.20 mm to configure an insulated electric wire. In Comparative Example 8, an electric wire having a size of 0.13 mm² was coated with the resin composition in a thickness of 0.20 mm to configure an insulated electric wire.

With respect to material properties, the "Shore D hardness" was "70" and the "cold resistance (° C.)" was "−11.4".

Comparative Example 7 gave the following results. With respect to the electric wire state, the "electric wire appearance (surface)" was "poor", and the "electric wire structure stability (eccentricity)" was "poor".

With respect to the electric wire properties, the "abrasion resistance (100 times or more)" was "good, 912", the "low-temperature resistance (winding test)" was "poor", the "low-temperature impact resistance" was "good", and the "thermal aging resistance" was "good".

Comparative Example 8 gave the following results. With respect to the electric wire state, the "electric wire appearance (surface)" was "poor", and the "electric wire structure stability (eccentricity)" was "poor".

With respect to the electric wire properties, the "abrasion resistance (100 times or more)" was "good, 496", and the "low-temperature resistance (winding test)", "low-temperature impact resistance", and "thermal aging resistance" were each "good".

Examples 9 to 12 and Comparative Examples 5 to 8 described above are shown in Table 2.

ene/styrene)), and (F) 0.7 parts by weight of a processing aid (specifically, 0.5 parts by weight of PMMA (methyl methacrylate copolymer) and 0.2 parts by weight of a polyethylene wax). In Example 13, an electric wire having a size of 0.35 mm² was coated with the resin composition in a thickness of 0.20 mm to configure an insulated electric wire. In Example 14, an electric wire having a size of 0.13 mm² was coated with the resin composition in a thickness of 0.20 mm to configure an insulated electric wire.

With respect to material properties, the "Shore D hardness" was "69" and the "cold resistance (° C.)" was "−12.2".

Example 13 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 987", and the "low-temperature resistance (winding test)", "low-temperature impact resistance", and "thermal aging resistance" were each "good".

Example 14 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 441", and the "low-temperature resistance (winding test)", "low-temperature impact resistance", and "thermal aging resistance" were each "good".

TABLE 2

|  |  |  | Example 9 | Example 10 | Example 11 | Example 12 | Comparative Example 5 | Comparative Example 6 | Comparative Example 7 | Comparative Example 8 |
|---|---|---|---|---|---|---|---|---|---|---|
| Recipe | A | PVC (average degree of polymerization, 1,300) | 100 | | 100 | | 100 | | 100 | |
| | B | Plasticizer (n-TOTM) | 25 | | 25 | | 25 | | 25 | |
| | C | Stabilizer (Ca/Zn-based) | 5 | | 10 | | 4 | | 11 | |
| | D | Synthetic calcium carbonate | 2 | | 2 | | 2 | | 2 | |
| | | Silica | 3 | | 3 | | 3 | | 3 | |
| | E | MBS (methyl methacrylate/butadieneistyrene) | 3 | | 3 | | 3 | | 3 | |
| | F | Acrylic processing aid (MMA) | 0.5 | | 0.5 | | 0.5 | | 0.5 | |
| | | PE wax | 0.2 | | 0.2 | | 0.2 | | 0.2 | |
| Material property | | Hardness (Shore D) | 70 | | 70 | | 69 | | 70 | |
| | | Cold resistance (° C.) | −12.4 | | −11.8 | | −12.7 | | −11.4 | |
| Electric wire state | | Size of electric wire (sq) | 0.35 | 0.13 | 0.35 | 0.13 | 0.35 | 0.13 | 0.35 | 0.13 |
| | | Coating thickness of electric wire (mm) | 0.20 | 0.20 | C.20 | 0.20 | 0.20 | 0.20 | 0.20 | 0.20 |
| | | Electric sire appearance (surface) | good | good | good | good | good | good | poor | poor |
| | | Electric wire structure stability (eccentricity) | good | good | good | good | good | good | poor | poor |
| Electric wire property | | Abrasion resistance | good 1054 | good 454 | good 986 | good 516 | good 1004 | good 502 | good 912 | good 496 |
| | | Low-temperature resistance (winding test) | good | good | good | good | good | good | poor | good |
| | | Low-temperature impact resistance | good | good | good | good | good | good | good | good |
| | | Thermal aging resistance | good | good | good | good | poor | poor | good | good |

Example 13 and Example 14

In Example 13 and Example 14, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 2 parts by weight of a reinforcing agent (specifically, 1 part by weight of synthetic calcium carbonate and 1 part by weight of fine-powder silica), (E) 3 parts by weight of an impact absorber (specifically, MBS (methyl methacrylate/butadi- Example 15 and Example 16

In Example 15 and Example 16, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 10 parts by weight of a reinforcing agent (specifically, 3 parts by weight of synthetic calcium carbonate and 7 parts by weight of fine-powder silica), (E) 3 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Example 15, an electric wire having a size of 0.35 $mm^2$ was coated with the resin composition in a thickness of 0.20 mm to configure an insulated electric wire. In Example 16, an electric wire having a size of 0.13 $mm^2$ was coated with the resin composition in a thickness of 0.20 mm to configure an insulated electric wire.

With respect to material properties, the "Shore D hardness" was "70" and the "cold resistance (° C.)" was "−11.4".

Example 15 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 1,084", and the "low-temperature resistance (winding test)", "low-temperature impact resistance", and "thermal aging resistance" were each "good".

Example 16 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 506", and the "low-temperature resistance (winding test)", "low-temperature impact resistance", and "thermal aging resistance" were each "good".

Comparative Example 9 and Comparative Example 10

In Comparative Example 9 and Comparative Example 10, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 1 part by weight of a reinforcing agent (specifically, 0.5 parts by weight of synthetic calcium carbonate and 0.5 parts by weight of fine-powder silica), (E) 3 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Comparative Example 9, an electric wire having a size of 0.35 $mm^2$ was coated with the resin composition in a thickness of 0.20 mm to configure an insulated electric wire. In Comparative Example 10, an electric wire having a size of 0.13 $mm^2$ was coated with the resin composition in a thickness of 0.20 mm to configure an insulated electric wire.

With respect to material properties, the "Shore D hardness" was "69" and the "cold resistance (° C.)" was "−12.6".

Comparative Example 9 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 879", the "low-temperature resistance (winding test)" was "good", the "low-temperature impact resistance" was "poor", and the "thermal aging resistance" was "good".

Comparative Example 10 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 341", the "low-temperature resistance (winding test)" was "good", the "low-temperature impact resistance" was "poor", and the "thermal aging resistance" was "good".

Comparative Example 11 and Comparative Example 12

In Comparative Example 11 and Comparative Example 12, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 12 parts by weight of a reinforcing agent (specifically, 4 parts by weight of synthetic calcium carbonate and 8 parts by weight of fine-powder silica), (E) 3 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Comparative Example 11, an electric wire having a size of 0.35 $mm^2$ was coated with the resin composition in a thickness of 0.20 mm to configure an insulated electric wire. In Comparative Example 12, an electric wire having a size of 0.13 $mm^2$ was coated with the resin composition in a thickness of 0.20 mm to configure an insulated electric wire.

With respect to material properties, the "Shore D hardness" was "70" and the "cold resistance (° C.)" was "−10.8".

Comparative Example 11 gave the following results. With respect to the electric wire state, the "electric wire appearance (surface)" was "poor", and the "electric wire structure stability (eccentricity)" was "good".

With respect to the electric wire properties, the "abrasion resistance (100 times or more)" was "good, 846", the "low-temperature resistance (winding test)" was "poor", the "low-temperature impact resistance" was "poor", and the "thermal aging resistance" was "good".

Comparative Example 12 gave the following results. With respect to the electric wire state, the "electric wire appearance (surface)" was "poor", and the "electric wire structure stability (eccentricity)" was "good".

With respect to the electric wire properties, the "abrasion resistance (100 times or more)" was "good, 358", the "low-temperature resistance (winding test)" was "poor", the "low-temperature impact resistance" was "good", and the "thermal aging resistance" was "good".

Examples 13 to 16 and Comparative Examples 9 to 12 described above are shown in Table 3.

TABLE 3

| | | | Example 13 | Example 14 | Example 15 | Example 16 | Comparative Example 9 | Comparative Example 10 | Comparative Example 11 | Comparative Example 12 |
|---|---|---|---|---|---|---|---|---|---|---|
| Recipe | A | PVC (average degree of polymerization, 1,300) | 100 | | 100 | | 100 | | 100 | |
| | B | Plasticizer (n-TOTM) | 25 | | 25 | | 25 | | 25 | |
| | C | Stabilizer (Ca/Zn-based) | 5 | | 5 | | 5 | | 5 | |
| | D | Synthetic calcium carbonate | 1 | | 3 | | 0.5 | | 4 | |
| | | Silica | 1 | | 7 | | 0.5 | | 8 | |
| | E | MBS (methyl methacrylate/butadiene/styrene) | 3 | | 3 | | 3 | | 3 | |
| | F | Acrylic processing aid (MMA) | 0.5 | | 0.5 | | 0.5 | | 0.5 | |
| | | PE wax | 0.2 | | 0.2 | | 0.2 | | 0.2 | |
| Material property | | Hardness (Shore D) | 69 | | 70 | | 69 | | 70 | |
| | | Cold resistance (° C.) | −12.2 | | −11.4 | | −12.6 | | −10.8 | |
| Electric wire state | | Size of electric wire (sq) | 0.35 | 0.13 | 0.35 | 0.13 | 0.35 | 0.13 | 0.35 | 0.13 |
| | | Coating thickness of electric wire (mm) | 0.20 | 0.20 | 0.20 | 0.20 | 0.20 | 0.20 | 0.20 | 0.20 |
| | | Electric wire appearance (surface) | good | good | good | good | good | good | poor | poor |
| | | Electric wire structure stability (eccentricity) | good | good | good | good | good | good | good | good |
| Electric wire property | | Abrasion resistance | good 987 | good 441 | good 1084 | good 506 | good 879 | good 341 | good 846 | good 358 |
| | | Low-temperature resistance (winding test) | good | good | good | good | good | good | poor | poor |
| | | Low-temperature impact resistance | good | good | good | good | poor | poor | poor | good |
| | | Thermal aging resistance | good | good | good | good | good | good | good | good |

Example 17 and Example 18

In Example 17 and Example 18, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 2 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Example 17, an electric wire having a size of 0.35 mm² was coated with the resin composition in a thickness of 0.20 mm to configure an insulated electric wire. In Example 18, an electric wire having a size of 0.13 mm² was coated with the resin composition in a thickness of 0.20 mm to configure an insulated electric wire.

With respect to material properties, the "Shore D hardness" was "70" and the "cold resistance (° C.)" was "−12.2".

Example 17 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 1,063", and the "low-temperature resistance (winding test)", "low-temperature impact resistance", and "thermal aging resistance" were each "good".

Example 18 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 468", and the "low-temperature resistance (winding test)", "low-temperature impact resistance", and "thermal aging resistance" were each "good".

Example 19 and Example 20

In Example 19 and Example 20, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 8 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Example 19, an electric wire having a size of 0.35 mm² was coated with the resin composition in a thickness of 0.20 mm to configure an insulated electric wire. In Example 20, an electric wire having a size of 0.13 mm² was coated with the resin composition in a thickness of 0.20 mm to configure an insulated electric wire.

With respect to material properties, the "Shore D hardness" was "69" and the "cold resistance (° C.)" was "−15.3".

Example 19 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 1,157", and the "low-temperature resistance (winding test)", "low-temperature impact resistance", and "thermal aging resistance" were each "good".

Example 20 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 523", and the "low-temperature resistance (winding test)", "low-temperature impact resistance", and "thermal aging resistance" were each "good".

Comparative Example 13 and Comparative Example 14

In Comparative Example 13 and Comparative Example 14, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 1 part by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Comparative Example 13, an electric wire having a size of 0.35 mm$^2$ was coated with the resin composition in a thickness of 0.20 mm to configure an insulated electric wire. In Comparative Example 14, an electric wire having a size of 0.13 mm$^2$ was coated with the resin composition in a thickness of 0.20 mm to configure an insulated electric wire.

With respect to material properties, the "Shore D hardness" was "70" and the "cold resistance (° C.)" was "−11.6".

Comparative Example 13 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 966", the "low-temperature resistance (winding test)" was "good", the "low-temperature impact resistance" was "poor", and the "thermal aging resistance" was "good".

Comparative Example 14 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 432", the "low-temperature resistance (winding test)" was "good", the "low-temperature impact resistance" was "poor", and the "thermal aging resistance" was "good".

Comparative Example 15 and Comparative Example 16

In Comparative Example 15 and Comparative Example 16, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 10 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Comparative Example 15, an electric wire having a size of 0.35 mm$^2$ was coated with the resin composition in a thickness of 0.20 mm to configure an insulated electric wire. In Comparative Example 16, an electric wire having a size of 0.13 mm$^2$ was coated with the resin composition in a thickness of 0.20 mm to configure an insulated electric wire.

With respect to material properties, the "Shore D hardness" was "68" and the "cold resistance (° C.)" was "−16.1".

Comparative Example 15 gave the following results. With respect to the electric wire state, the "electric wire appearance (surface)" was "good", and the "electric wire structure stability (eccentricity)" was "poor".

With respect to the electric wire properties, the "abrasion resistance (100 times or more)" was "good, 893", and the "low-temperature resistance (winding test)", "low-temperature impact resistance", and "thermal aging resistance" were each "good".

Comparative Example 16 gave the following results. With respect to the electric wire state, the "electric wire appearance (surface)" was "good", and the "electric wire structure stability (eccentricity)" was "poor".

With respect to the electric wire properties, the "abrasion resistance (100 times or more)" was "good, 414", and the "low-temperature resistance (winding test)", "low-temperature impact resistance", and "thermal aging resistance" were each "good".

Examples 17 to 20 and Comparative Examples 13 to 16 described above are shown in Table 4.

TABLE 4

| | | | Example 17 | | Example 18 | | Example 19 | | Example 20 | | Comparative 13 | | Comparative 14 | | Comparative 15 | | Comparative 16 | |
|---|---|---|---|---|---|---|---|---|---|---|---|---|---|---|---|---|---|---|
| Recipe | A | PVC (average degree of polymerization, 1,300) | 100 | | | | | | | | 100 | | | | 100 | | 100 | |
| | B | Plasticizer (n-TOTE) | 25 | | | | | | | | 25 | | | | 25 | | 25 | |
| | C | Stabilizer (Ca/Zn-based) | 5 | | | | | | | | 5 | | | | 5 | | 5 | |
| | D | Synthetic calcium carbonate | 2 | | | | | | | | 2 | | | | 2 | | 2 | |
| | | Silica | 3 | | | | | | | | 3 | | | | 3 | | 3 | |
| | E | MBS (methyl methacrylate/butadiene/styrene) | 2 | | 8 | | | | | | 1 | | | | 10 | | | |
| | F | Acrylic processing aid (MMA) | 0.5 | | | | | | | | 0.5 | | | | 0.5 | | 0.5 | |
| | | PE wax | 0.2 | | | | | | | | 0.2 | | | | 0.2 | | 0.2 | |
| Material property | | Hardness (Shore D) | 70 | | 69 | | | | | | 70 | | | | 68 | | | |
| | | Cold resistance (° C.) | −12.2 | | −15.3 | | | | | | −11.6 | | | | −16.1 | | | |
| Electric wire state | | Size of electric wire (sq) | 0.35 | 0.13 | 0.35 | 0.13 | | | | | 0.35 | 0.13 | | | 0.35 | 0.13 | | |
| | | Coating thickness of electric wire (mm) | 0.2 | 0.2 | 0.2 | 0.2 | | | | | 0.2 | 0.2 | | | 0.2 | 0.2 | | |

TABLE 4-continued

| | | Example 17 | Example 18 | Example 19 | Example 20 | Comparative 13 | Comparative 14 | Comparative 15 | Comparative 16 |
|---|---|---|---|---|---|---|---|---|---|
| | Electric wire appearance (surface) | good | good | good | good | good | good | good | good |
| | Electric wire structure stability (eccentricity) | good | good | good | good | good | good | poor | poor |
| Electric wire property | Abrasion resistance | good 1063 | good 468 | good 1157 | good 523 | good 966 | good 432 | good 893 | good 414 |
| | Low-temperature resistance (winding test) | good | good | good | good | good | good | good | good |
| | Low-temperature impact resistance | good | good | good | good | poor | poor | good | good |
| | Thermal aging resistance | good | good | good | good | good | good | good | good |

Example 21 and Example 22

In Example 21 and Example 22, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 3 parts by weight of an impact absorber (specifically, MBS (methyl methacrylate/butadiene/styrene)), and (F) 0.3 parts by weight of a processing aid (specifically, 0.2 parts by weight of PMMA (methyl methacrylate copolymer) and 0.1 part by weight of a polyethylene wax). In Example 21, an electric wire having a size of 0.35 mm² was coated with the resin composition in a thickness of 0.20 mm to configure an insulated electric wire. In Example 22, an electric wire having a size of 0.13 mm² was coated with the resin composition in a thickness of 0.20 mm to configure an insulated electric wire.

With respect to material properties, the "Shore D hardness" was "70" and the "cold resistance (° C.)" was "−12.4".

Example 21 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 868", and the "low-temperature resistance (winding test)", "low-temperature impact resistance", and "thermal aging resistance" were each "good".

Example 22 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 447", and the "low-temperature resistance (winding test)", "low-temperature impact resistance", and "thermal aging resistance" were each "good".

Example 23 and Example 24

In Example 23 and Example 24, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 3 parts by weight of an impact absorber (specifically, MBS (methyl methacrylate/butadiene/styrene)), and (F) 1.2 parts by weight of a processing aid (specifically, 0.8 parts by weight of PMMA (methyl methacrylate copolymer) and 0.4 parts by weight of a polyethylene wax). In Example 23, an electric wire having a size of 0.35 mm² was coated with the resin composition in a thickness of 0.20 mm to configure an insulated electric wire. In Example 24, an electric wire having a size of 0.13 mm² was coated with the resin composition in a thickness of 0.20 mm to configure an insulated electric wire.

With respect to material properties, the "Shore D hardness" was "70" and the "cold resistance (° C.)" was "−13.6".

Example 23 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 885", and the "low-temperature resistance (winding test)", "low-temperature impact resistance", and "thermal aging resistance" were each "good".

Example 24 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 512", and the "low-temperature resistance (winding test)", "low-temperature impact resistance", and "thermal aging resistance" were each "good".

Comparative Example 17 and Comparative Example 18

In Comparative Example 17 and Comparative Example 18, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 3 parts by weight of an impact absorber (specifically, MBS (methyl methacrylate/butadiene/styrene)), and (F) 0.2 parts by weight of a processing aid (specifically, PMMA (methyl methacrylate copolymer)). In Comparative Example 17, an electric wire having a size of 0.35 mm² was coated with the resin composition in a thickness of 0.20 mm to configure an insulated electric wire. In Comparative Example 18, an electric wire having a size of 0.13 mm² was coated with the resin composition in a thickness of 0.20 mm to configure an insulated electric wire.

With respect to material properties, the "Shore D hardness" was "70" and the "cold resistance (° C.)" was "−12.0".

Comparative Example 17 gave the following results. With respect to the electric wire state, the "electric wire appearance (surface)" was "poor", and the "electric wire structure stability (eccentricity)" was "good".

With respect to the electric wire properties, the "abrasion resistance (100 times or more)" was "good, 968", and the "low-temperature resistance (winding test)", "low-temperature impact resistance", and "thermal aging resistance" were each "good".

Comparative Example 18 gave the following results. With respect to the electric wire state, the "electric wire appearance (surface)" was "poor", and the "electric wire structure stability (eccentricity)" was "good".

With respect to the electric wire properties, the "abrasion resistance (100 times or more)" was "good, 467", and the "low-temperature resistance (winding test)", "low-temperature impact resistance", and "thermal aging resistance" were each "good".

Comparative Example 19 and Comparative Example 20

In Comparative Example 19 and Comparative Example 20, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 3 parts by weight of an impact absorber (specifically, MBS (methyl methacrylate/butadiene/styrene)), and (F) 1.5 parts by weight of a processing aid (specifically, 1.0 part by weight of PMMA (methyl methacrylate copolymer) and 0.5 parts by weight of a polyethylene wax). In Comparative Example 19, an electric wire having a size of 0.35 mm² was coated with the resin composition in a thickness of 0.20 mm to configure an insulated electric wire. In Comparative Example 20, an electric wire having a size of 0.13 mm² was coated with the resin composition in a thickness of 0.20 mm to configure an insulated electric wire.

With respect to material properties, the "Shore D hardness" was "68" and the "cold resistance (° C.)" was "−13.8".

Comparative Example 19 gave the following results. With respect to the electric wire state, the "electric wire appearance (surface)" was "good", and the "electric wire structure stability (eccentricity)" was "poor".

With respect to the electric wire properties, the "abrasion resistance (100 times or more)" was "good, 785", and the "low-temperature resistance (winding test)", "low-temperature impact resistance", and "thermal aging resistance" were each "good".

Comparative Example 20 gave the following results. With respect to the electric wire state, the "electric wire appearance (surface)" was "good", and the "electric wire structure stability (eccentricity)" was "poor".

With respect to the electric wire properties, the "abrasion resistance (100 times or more)" was "good, 372", and the "low-temperature resistance (winding test)", "low-temperature impact resistance", and "thermal aging resistance" were each "good".

Examples 21 to 24 and Comparative Examples 17 to 20 described above are shown in Table 5.

TABLE 5

| | | | Example 21 | Example 22 | Example 23 | Example 24 | Comparative Example 17 | Comparative Example 18 | Comparative Example 19 | Comparative Example 20 |
|---|---|---|---|---|---|---|---|---|---|---|
| Recipe | A | PVC (average degree of polymerization, 1,300) | 100 | | 100 | | 100 | | 100 | |
| | B | Plasticizer (n-TOTM) | 25 | | 25 | | 25 | | 25 | |
| | C | Stabilizer (Ca/Zn-based) | 5 | | 5 | | 5 | | 5 | |
| | D | Synthetic calcium carbonate | 2 | | 2 | | 2 | | 2 | |
| | | Silica | 3 | | 3 | | 3 | | 3 | |
| | E | MBS (methyl methacrylate/butadiene/styrene) | 3 | | 3 | | 3 | | 3 | |
| | F | Acrylic processing aid (MMA) | 0.2 | | 0.8 | | 0.2 | | 1 | |
| | | PE wax | 0.1 | | 0.4 | | — | | 0.5 | |
| Material property | | Hardness (Shore D) | 70 | | 70 | | 70 | | 68 | |
| | | Cold resistance (° C.) | −12.4 | | −13.6 | | −12.0 | | −13.8 | |
| Electric wire state | | Size of electric wire (sq) | 0.35 | 0.13 | 0.35 | 0.13 | 0.35 | 0.13 | 0.35 | 0.13 |
| | | Coating thickness of electric wire (mm) | 0.2 | 0.2 | 0.2 | 0.2 | 0.2 | 0.2 | 0.2 | 0.2 |
| | | Electric wire appearance (surface) | good | good | good | good | poor | poor | good | good |
| | | Electric wire structure stability (eccentricity) | good | good | good | good | good | good | poor | poor |
| Electric wire property | | Abrasion resistance | good 868 | good 447 | good 885 | good 512 | brood 968 | good 467 | good 785 | good 372 |
| | | Low-temperature resistance (winding test) | good | good | good | good | good | good | good | good |
| | | Low-temperature impact resistance | good | good | good | good | good | good | good | good |
| | | Thermal aging resistance | good | good | good | good | good | good | good | good |

Example 25 to Example 27

In Example 25 to Example 27, use was made of a resin composition configured by compounding (A) 100 parts by weight of polyvinyl chloride (specifically, one having an average degree of polymerization of 1,300) with (B) 26 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 4 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Example 25 to Example 27, an electric wire having a size of 1.25 mm$^2$ was coated with the resin composition in thicknesses of 0.15 mm, 0.20 mm, and 0.25 mm, respectively, to configure insulated electric wires.

With respect to material properties, the "Shore D hardness" was "67" and the "cold resistance (° C.)" was "−12.8".

Example 25 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 1,168", and the "low-temperature resistance (winding test)", "low-temperature impact resistance", and "thermal aging resistance" were each "good".

Example 26 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, >2,000", and the "low-temperature resistance (winding test)", "low-temperature impact resistance", and "thermal aging resistance" were each "good".

Example 27 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, >2,000", and the "low-temperature resistance (winding test)", "low-temperature impact resistance", and "thermal aging resistance" were each "good".

Example 28 to Example 30

In Example 28 to Example 30, use was made of a resin composition configured by compounding (A) 100 parts by weight of polyvinyl chloride (specifically, one having an average degree of polymerization of 1,300) with (B) 28 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 4 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). In Example 28 to Example 30, an electric wire having a size of 1.25 mm$^2$ was coated with the resin composition in thicknesses of 0.15 mm, 0.20 mm, and 0.25 mm, respectively, to configure insulated electric wires.

With respect to material properties, the "Shore D hardness" was "63" and the "cold resistance (° C.)" was "−18.2".

Example 28 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 712", and the "low-temperature resistance (winding test)", "low-temperature impact resistance", and "thermal aging resistance" were each "good".

Example 29 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 1,204", and the "low-temperature resistance (winding test)", "low-temperature impact resistance", and "thermal aging resistance" were each "good".

Example 30 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, >2,000", and the "low-temperature resistance (winding test)", "low-temperature impact resistance", and "thermal aging resistance" were each "good".

Comparative Example 21

In Comparative Example 21, use was made of a resin composition configured by compounding (A) 100 parts by weight of polyvinyl chloride (specifically, one having an average degree of polymerization of 1,300) with (B) 25 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 4 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). An electric wire having a size of 1.25 mm$^2$ was coated with the resin composition in a thickness of 0.15 mm to configure an insulated electric wire.

With respect to material properties, the "Shore D hardness" was "68" and the "cold resistance (° C.)" was "−11.2".

Comparative Example 21 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, >2,000", the "low-temperature resistance (winding test)" was "good", the "low-temperature impact resistance" was "poor", and the "thermal aging resistance" was "good".

Comparative Example 22

In Comparative Example 22, use was made of a resin composition configured by compounding (A) 100 parts by weight of polyvinyl chloride (specifically, one having an average degree of polymerization of 1,300) with (B) 30 parts by weight of a trimellitic-acid-based ester plasticizer (n-TOTM), (C) 5 parts by weight of a non-lead stabilizer (specifically, a Ca/Zn-based stabilizer), (D) 5 parts by weight of a reinforcing agent (specifically, 2 parts by weight of synthetic calcium carbonate and 3 parts by weight of fine-powder silica), (E) 4 parts by weight of an impact absorber (specifically, MBS (methyl methacrylate/butadiene/styrene)), and (F) 0.7 parts by weight of a processing aid (specifically, 0.5 parts by weight of PMMA (methyl methacrylate copolymer) and 0.2 parts by weight of a polyethylene wax). An electric wire having a size of 1.25 mm² was coated with the resin composition in a thickness of 0.15 mm to configure an insulated electric wire.

With respect to material properties, the "Shore D hardness" was "62" and the "cold resistance (° C.)" was "−22.4".

Comparative Example 22 gave the following results. With respect to the electric wire state, the "electric wire appearance (surface)" was "good", and the "electric wire structure stability (eccentricity)" was "good".

With respect to the electric wire properties, the "abrasion resistance (100 times or more)" was "good, 472", the "low-temperature resistance (winding test)" was "good", the "low-temperature impact resistance" was "poor", and the "thermal aging resistance" was "good".

Examples 25 to 30 and Comparative Examples 21 and 22 described are shown in Table 6.

TABLE 6

|  |  |  | Example 25 | Example 26 | Example 27 | Example 28 | Example 29 | Example 30 | Comparative Example 21 | Comparative Example 22 |
|---|---|---|---|---|---|---|---|---|---|---|
| Recipe | A | PVC (average degree of polymerization, 1,300) | 100 | | | 100 | | | 100 | 100 |
| | B | Plasticizer (n-TOTM) | 26 | | | 28 | | | 25 | 30 |
| | C | (Stabilizer (Ca/Zn-based) | 5 | | | 5 | | | 5 | 5 |
| | D | Synthetic calcium carbonate | 2 | | | 2 | | | 2 | 2 |
| | | Silica | 3 | | | 3 | | | 3 | 3 |
| | E | MBS (methyl methacrylate/butadiene/styrene) | 4 | | | 4 | | | 4 | 4 |
| | F | Acrylic processing aid (MMA) | 0.5 | | | 0.5 | | | 0.5 | 0.5 |
| | | PE wax | 0.2 | | | 0.2 | | | 0.2 | 0.2 |
| Material property | | Hardness (Shore D) | 67 | | | 63 | | | 68 | 62 |
| | | Cold resistance (° C.) | −12.8 | | | −18.2 | | | −11.2 | −22.4 |
| Electric wire state | | Size of electric wire (sq) | 1.25 | 1.25 | 1.25 | 1.25 | 1.25 | 1.25 | 1.25 | 1.25 |
| | | Coating thickness of electric wire (mm) | 0.15 | 0.2 | 0.25 | 0.15 | 0.2 | 0.25 | 0.15 | 0.15 |
| | | Electric wire appearance (surface) | good | good | good | good | good | good | good | good |
| | | Electric wire structure stability (eccentricity) | good | good | good | good | good | good | good | good |
| Electric wire property | | Abrasion resistance | good 1168 | good >2000 | good >2000 | good 712 | good 1204 | good >2000 | good >2000 | good 472 |
| | | Low-temperature resistance (winding test) | good | good | good | good | good | good | good | good |
| | | Low-temperature impact resistance | good | good | good | good | good | good | poor | poor |
| | | Thermal aging resistance | good | good | good | good | good | good | good | good |

The features of the polyvinyl chloride resin compositions for automotive electric wire of the invention and those of the ultrathin-wall low-voltage electric wire for automobile of the invention are briefly summarized below.

(i) A polyvinyl chloride resin composition for automotive electric wire which includes (A) 100 parts by weight of polyvinyl chloride and, incorporated thereinto, (B) 24.0-26.0 parts by weight of a trimellitic-acid-based ester plasticizer, (C) 5-10 parts by weight of a non-lead stabilizer, (D) 2-10 parts by weight of a reinforcing agent, (E) 2-8 parts by weight of an impact absorber, and (F) 0.3-1.2 parts by weight of a processing aid, and which has a Shore D hardness of 68 or higher and a cold resistance, as a property of the material, of −10° C. or below.

(ii) An ultrathin-wall low-voltage electric wire for automobile obtained by extrusion coating in a thickness of 0.15-0.25 mm using a polyvinyl chloride resin composition for automotive electric wire which includes (A) 100 parts by weight of polyvinyl chloride and, incorporated thereinto, (B) 24.0-26.0 parts by weight of a trimellitic-acid-based ester plasticizer, (C) 5-10 parts by weight of a non-lead stabilizer, (D) 2-10 parts by weight of a reinforcing agent, (E) 2-8 parts by weight of an impact absorber, and (F) 0.3-1.2 parts by weight of a processing aid, and which has a Shore D hardness of 68 or higher and a cold resistance, as a property of the material, of −10° C. or below.

(iii) A polyvinyl chloride resin composition for automotive electric wire which includes (A) 100 parts by weight of polyvinyl chloride and, incorporated thereinto, (B) 26.0-28.0 parts by weight of a trimellitic-acid-based ester plasticizer, (C) 5-10 parts by weight of a non-lead stabilizer, (D) 2-10 parts by weight of a reinforcing agent, (E) 2-8 parts by weight of an impact absorber, and (F) 0.3-1.2 parts by weight of a processing aid, and which has a Shore D hardness of 63-67 and a cold resistance of −20° C. to −12° C.

(iv) An ultrathin-wall low-voltage electric wire for automobile obtained by extrusion coating in a thickness of 0.15-0.25 mm using a polyvinyl chloride resin composition for automotive electric wire which includes (A) 100 parts by weight of polyvinyl chloride and, incorporated thereinto, (B) 26.0-28.0 parts by weight of a trimellitic-acid-based ester plasticizer, (C) 5-10 parts by weight of a non-lead stabilizer, (D) 2-10 parts by weight of a reinforcing agent, (E) 2-8 parts by weight of an impact absorber, and (F) 0.3-1.2 parts by weight of a processing aid, and which has a Shore D hardness of 63-67 and a cold resistance of −20° C. to −12° C.

What is claimed is:

1. A polyvinyl chloride resin composition for an automotive electric wire,
   which comprises (A) 100 parts by weight of polyvinyl chloride and, incorporated thereinto, (B) 24.0-26.0 parts by weight of a trimellitic-acid-based ester plasticizer, (C) 5-10 parts by weight of a non-lead stabilizer, (D) 2-10 parts by weight of a reinforcing agent including 1-3 parts by weight of synthetic calcium carbonate and 1-7 parts by weight of fine-powder silica, (E) 2-8 parts by weight of methyl methacrylate/butadiene/styrene (MBS) as an impact absorber, and (F) 0.3-1.2 parts by weight of a processing aid including 0.2-0.8 parts by weight of a methyl methacrylate copolymer and 0.1-0.4 parts by weight of a polyethylene wax, and which has a Shore D hardness of 68 or higher and a cold resistance, as a property of the material, of −10° C. or below.

2. An ultrathin-wall low-voltage electric wire for an automobile, which is obtained by extrusion coating in a thickness of 0.15-0.25 mm using a polyvinyl chloride resin composition which comprises (A) 100 parts by weight of polyvinyl chloride and, incorporated thereinto, (B) 24.0-26.0 parts by weight of a trimellitic-acid-based ester plasticizer, (C) 5-10 parts by weight of a non-lead stabilizer, (D) 2-10 parts by weight of a reinforcing agent including 1-3 parts by weight of synthetic calcium carbonate and 1-7 parts by weight of fine-powder silica, (E) 2-8 parts by weight of methyl methacrylate/butadiene/styrene (MBS) as an impact absorber, and (F) 0.3-1.2 parts by weight of a processing aid including 0.2-0.8 parts by weight a methyl methacrylate copolymer and 0.1-0.4 parts by weight of a polyethylene wax, and which has a Shore D hardness of 68 or higher and a cold resistance, as a property of the material, of −10° C. or below.

3. A polyvinyl chloride resin composition for an automotive electric wire, which comprises (A) 100 parts by weight of polyvinyl chloride and, incorporated thereinto, (B) 26.0-28.0 parts by weight of a trimellitic-acid-based ester plasticizer, (C) 5-10 parts by weight of a non-lead stabilizer, (D) 2-10 parts by weight of a reinforcing agent including 1-3 parts by weight of synthetic calcium carbonate and 1-7 parts by weight of fine-powder silica, (E) 2-8 parts by weight of methyl methacrylate/butadiene/styrene (MBS) as an impact absorber, and (F) 0.3-1.2 parts by weight of a processing aid including 0.2-0.8 parts by weight of a methyl methacrylate copolymer and 0.1-0.4 parts by weight of a polyethylene wax, and which has a Shore D hardness of 63-67 and a cold resistance of −20° C. to −12° C.

4. A ultrathin-wall low-voltage electric wire for an automobile, which is obtained by extrusion coating in a thickness of 0.15-0.25 mm using a polyvinyl chloride resin composition which comprises (A) 100 parts by weight of polyvinyl chloride and, incorporated thereinto, (B) 26.0-28.0 parts by weight of a trimellitic-acid-based ester plasticizer, (C) 5-10 parts by weight of a non-lead stabilizer, (D) 2-10 parts by weight of a reinforcing agent including 1-3 parts by weight of synthetic calcium carbonate and 1-7 parts by weight of fine-powder silica, (E) 2-8 parts by weight of methyl methacrylate/butadiene/styrene (MB S) as an impact absorber, and (F) 0.3-1.2 parts by weight of a processing aid including 0.2-0.8 parts by weight of a methyl methacrylate copolymer and 0.1-0.4 parts by weight of a polyethylene wax, and which has a Shore D hardness of 63-67 and a cold resistance of −20° C. to −12° C.

\* \* \* \* \*